(No Model.)
J. C. BURNESON & O. G. RICHEY.
APPARATUS FOR CLEANING STEAM BOILERS.
No. 596,571. Patented Jan. 4, 1898.
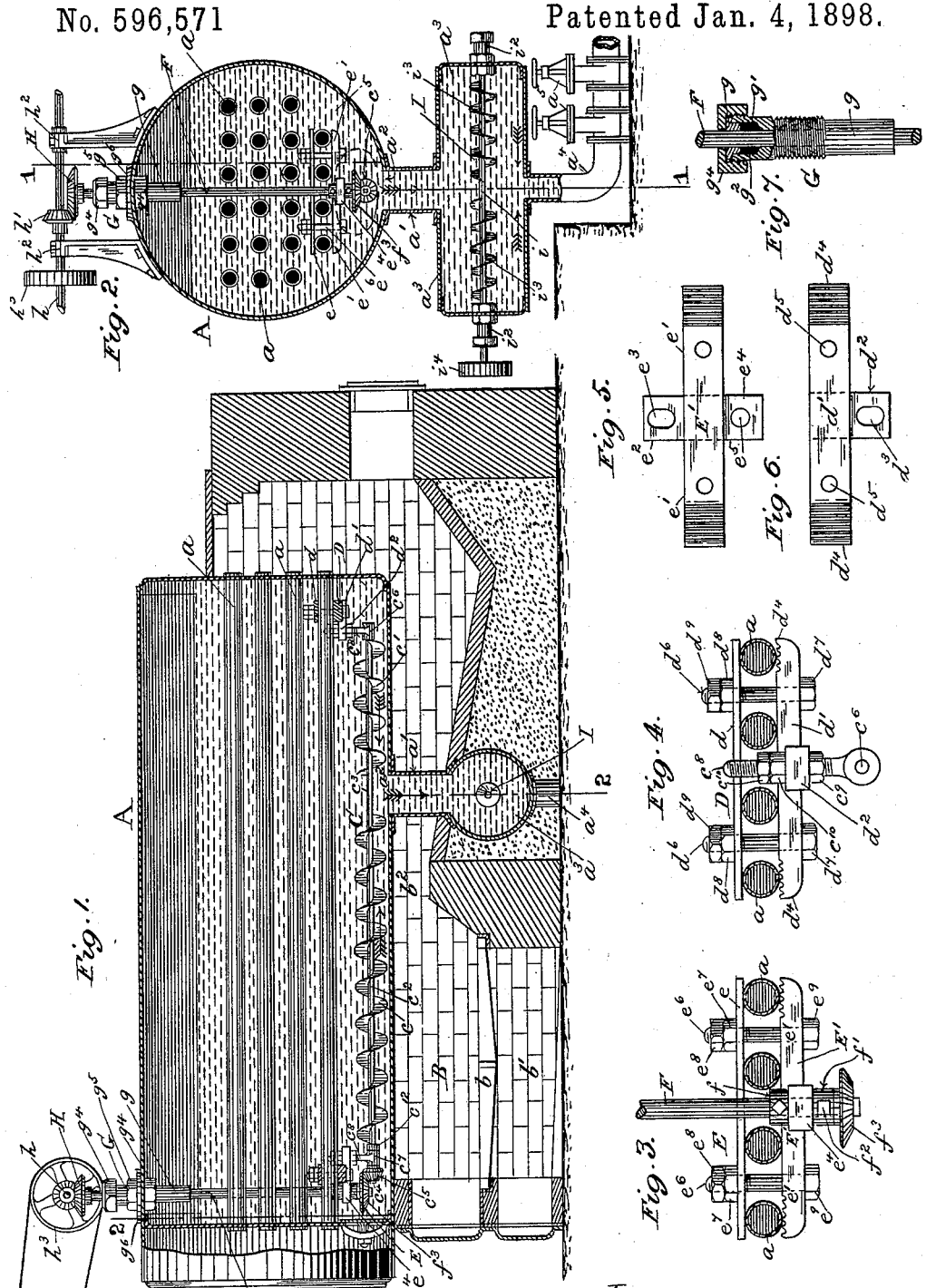
WITNESSES
Edward W. Furrell
Edw. L. Dillon
INVENTORS
John C. Burneson
Oliver G. Richey
by Benj. F. Rex atty.

UNITED STATES PATENT OFFICE.

JOHN C. BURNESON AND OLIVER G. RICHEY, OF ST. LOUIS, MISSOURI.

APPARATUS FOR CLEANING STEAM-BOILERS.

SPECIFICATION forming part of Letters Patent No. 596,571, dated January 4, 1898.

Application filed March 13, 1897. Serial No. 627,438. (No model.)

*To all whom it may concern:*

Be it known that we, JOHN C. BURNESON and OLIVER G. RICHEY, citizens of the United States, residing at St. Louis, in the State of Missouri, have made certain new and useful Improvements in Apparatuses for Cleaning Steam-Boilers and Preventing the Formation of Scale, of which the following is a specification.

When water containing impurities adapted to form a scale or stony crust is boiled in a steam-boiler, the impurities tend to first rise to the surface and form a scum upon the water; but in the end they are precipitated in the form of a slimy sediment. In an ordinary horizontal return-flue boiler having an up-draft grate the tendency of the currents created in the boiler by the admission of feed-water and the application of heat is to cause most of the sediment deposited to sink down in the rear part of the boiler, where the heat of the return-flues is greatest and that of the bottom of the boiler least. Part of it is caught in its descent by the flues, but the greatest part, as a rule, sinks to the bottom and is then carried forward by a current flowing along the bottom of the boiler toward the front end, where the heat is greatest, and deposited where it will do the most harm—above the furnace. In other constructions the same general rule applies, so far as the most highly-heated surfaces of the boiler are concerned. The tendency of the currents formed is always to carry the sediment to the hottest points. As soon as the slime begins to be deposited upon the highly-heated outside surfaces of the flues and the still more highly-heated inside surface of the boiler-shell above the furnace the formation of a crust or scale directly upon said surfaces begins, and layer after layer is added to it from the rear as more and more slime is deposited until not infrequently, when the water used is bad, a scale or crust an inch thick is formed before the boiler is taken out of use and cleaned, and sometimes the spaces between the flues are found almost filled with scale, it being impossible to either prevent the formation of scale or remove it when formed by merely opening the blow-off cocks at intervals and blowing off sediment in the usual manner, not only because the formation of scale is continually going on, but because no scale attached to the boiler-shell and only that portion of the unhardened sediment which happens to surround the inner ends of the blow-off pipes can be driven out in that way. Not only is scale formed above the furnace and on the most highly-seated portions of the flues, but it spreads and in time covers all those portions of the flues and shell which are designed to conduct heat directly from the products of combustion to the water. The consequence of this is a great loss of heat and waste of fuel, for the crust or scale formed is a poor conductor of heat. A scale one-sixteenth of an inch thick causes a loss of thirteen per cent. of the fuel consumed, and sixty per cent. of the fuel is lost when the scale reaches the thickness of half an inch. The usual average loss of efficiency from this cause is almost twenty-five per cent. in the Mississippi Valley. This loss of efficiency makes it necessary to use boilers with larger heating-surface than would otherwise be necessary, and where the engines used cannot be stopped at frequent intervals to enable the boilers to be cleaned a double set of boilers have to be provided, so that when one set is being cleaned the other can furnish the necessary supply of steam. In some large plants the boilers are cleaned regularly once a week, and the labor expended in doing this forms, in such plants, a considerable item of expense. Again, the formation of scale frequently, by preventing water from reaching the metal, causes boilers to burn and sometimes results in disastrous explosions.

The object of our invention is the avoidance of all the above-mentioned losses, dangers, and expenses by preventing scale from forming. Our method of doing this consists in preventing scale forming and slime from remaining upon the more highly-heated surfaces of the boiler by continuously forcing it away from such surfaces as fast as it reaches them by mechanical means and causing it to accumulate at a cooler point or points, where it can be blown off through an ordinary blow-off cock or cocks, and in blowing accumulated slime and sediment entirely out of the boiler system at frequent intervals, so as to remove it entirely from contact with the water in the boiler. Where the water is very bad, we preferably blow off sediment once every four hours, and in all cases where the water tends to form scale sediment should be blown off at least once a day. The effect of this is, first, to prevent the formation of scale upon the surfaces from which the slime is removed; second, the purification of the water in the boiler, and, third, the dissolving by the purified water of any slime deposited upon the flues and the prevention of the formation of scale thereon. The slime thus dissolved ultimately reaches the bottom of the boiler and is removed from the boiler system in the manner above described. Not only will water purified by the frequent removal of slime deposited upon the bottom of the boiler dissolve any slime deposited upon the flues, but where there is in the beginning scale upon the inside of the boiler this scale will also, as we have found by careful tests, be dissolved and removed, and the boiler will first be made perfectly clean and then kept so.

Our improved method is applicable to boilers of all forms, but we have illustrated it and the apparatus which we prefer to use in connection with an ordinary horizontal cylindrical return-flue boiler with an updraft-grate.

In the apparatus illustrated, Figure 1 is a vertical longitudinal section on line 1 1, Fig. 2. Fig. 2 is a transverse section on line 2 2, Fig. 1. Fig. 3 is a detailed view in front elevation, on an enlarged scale, of a frame for supporting the front end of a conveyer-shaft, the lower end of a driving-shaft, and means for transmitting motion from the latter to the former. Fig. 4 is a detailed view in front elevation, on an enlarged scale, of a frame for supporting the rear end of said conveyer-shaft. Fig. 5 is a detailed plan view, on an enlarged scale, of a part of the frame shown in Fig. 3. Fig. 6 is a similar view of a corresponding part of the frame shown in Fig. 4; and Fig. 7 is a detailed sectional elevation, on an enlarged scale, of a combined gland and bearing.

Similar letters refer to similar parts throughout the several views.

A represents a horizontal cylindrical boiler of common form, having a series of return-flues $a$ extending from end to end thereof and provided with a leg $a'$, whose mouth $a^2$ receives deposits from the boiler and whose lower end discharges into the usual mud-drum $a^3$. The mud-drum shown is of a size suitable for a single boiler, and only one boiler is shown discharging into it, but, as will be obvious, it might be much longer and receive deposits from a series of boilers without affecting the operation of our apparatus. The usual blow-off pipe $a^4$ shown, provided with a pair of gate-valves $a^5$, connects with the mud-drum.

B represents the boiler-furnace; $b$, the grate; $b'$, the ash-pit, and $b^2$ a flue for the passage of products of combustion beneath the boiler to the rear end thereof.

C represents a conveyer which preferably has a right-hand blade $c$ and a left-hand blade $c'$ attached to a common shaft $c^2$ and terminating opposite each other, with a space $c^3$ between them. This conveyer is preferably arranged longitudinally and centrally near the bottom of the boiler and so as to bring the space $c^3$ above the mouth $a^2$ of the leg $a'$. The front end $c^4$ of the shaft $c^2$ is preferably squared or otherwise shaped, so as to prevent a pinion slipped thereon from turning upon it, and carries a pinion $c^5$. The conveyer is journaled in bearings $c^6$ and $c^7$, respectively, attached to the lower ends of vertical screw-threaded rods $c^8$ $c^8$, which are preferably suspended from the lower row of flues $a$ and held in place by means of frames D and E.

The frame D supports the rear end of the conveyer. It preferably consists of a cross-plate $d$, resting upon the tops of the lowermost row of flues, and a cross-bar $d'$, held against the under sides of the same row of flues and having a forwardly-projecting arm $d^2$, containing a vertical longitudinal slot $d^3$, and means for fastening said plates together and clamping them upon said flues. The bar $d'$ is preferably corrugated transversely on its upper side in the neighborhood of its ends $d^4$ and contains bolt-holes $d^5$ $d^5$, and said plate $d$ and cross-bar $d'$ are preferably secured together and clamped upon the intervening flues by means of screw-bolts $d^6$, which pass through them and whose heads $d^7$ preferably rest against the lower side of the bar $d'$, and which are preferably each provided at their respective screw-threaded ends with an ordinary nut $d^8$ and a jam-nut $d^9$.

The screw-threaded rod $c^8$, attached to the rear bearing $c^6$, passes up through the slot $d^3$ in the arm $d^2$ of the frame D and is fastened securely in position by means of a nut $c^9$ beneath said arm $d^2$, a similar nut $c^{10}$ above said arm, and a jam-nut $c^{11}$. Rear movement on the part of the conveyer-shaft is prevented by the thrust in the opposite direction given the conveyer when it is rotated. Endwise movement of the conveyer-shaft toward the front end of the boiler is prevented by means of a collar $c^{12}$, resting against the inner end of the bearing $c^7$ and secured in place by means of a set-screw $c^{13}$.

The frame E consists of a transverse plate $e$, pierced by bolt-holes, a cross E', having two long arms $e'$, transversely corrugated on top near their respective outer ends, a rearwardly-projecting arm $e^2$, pierced by a vertical longitudinal slot $e^3$, and a forwardly-projecting arm $e^4$, containing a bearing $e^5$ for a vertical shaft, and screw-bolts $e^6$ $e^6$, having common nuts $e^7$ and jam-nuts $e^8$ for securing said cross and plate together.

The plate $e$ is shown resting upon the lowermost row of flues $a$, and the long arms of the cross E' are preferably held up against the under sides of the same flues. The bolts $e^6$ are provided with heads $e^9$ and pass upward through the cross E' and the plate $e$ and are caused by screwing their nuts $e^7$ home to clamp the plate $e$ and the cross E′ firmly upon the flues between them. The loosening of the nuts $e^7$ is prevented by the jam-nuts $e^8$, and the corrugated surfaces of the cross E′ tend to prevent its slipping endwise.

F is a vertical driving-shaft. It passes through the shaft-hole $e^5$ in the arm $e^4$ of the frame E, and its lower end is preferably squared or otherwise formed so as to afford a seat for a gear-wheel upon which the latter cannot turn. It is provided with two collars $f$ and $f'$, each provided with a set-screw $f^2$, by means of which they are secured in position. The collar $f$ preferably rests upon the top of the arm $e^4$ and thus limits the downward movement of the shaft, while the collar $f'$ is arranged directly beneath said arm and prevents the shaft from lifting. Upon the lower end of the shaft F a bevel-wheel $f^3$ is slipped, which meshes in with the pinion $c^5$, and when said bevel-wheel and pinion are made to mesh they lock each other in place, so that no other means of preventing outward movement on the part of either are required.

The shaft F passes up and out through a gland G, secured in an opening in the top of the boiler and having a sleeve $g$, which preferably extends down into the boiler and affords the shaft F a firm support. This sleeve preferably has a concave head $g'$, containing a packing $g^2$, upon which rests a follower $g^3$, which is forced down upon it by means of a nut $g^4$. Said sleeve is screw-threaded for a portion of its length and is preferably secured in position by means of a nut $g^4$ on the inside of the boiler-shell and a similar nut $g^5$ upon the outside. A washer $g^6$, made concave on the bottom, so as to fit the boiler-shell, and flat on top, is preferably interposed between the boiler-shell and the nut $g^5$ in order to reinforce and strengthen the former. To the top of the shaft F a bevel-gear H is preferably secured, to which motion is preferably communicated from a shaft $h$ through a pinion $h'$. This shaft is preferably supported in whole or in part by bearings $h^2$, preferably attached to and supported by the shell of the boiler. Upon the shaft $h$ a pulley $h^3$ is shown.

I represents a right and left hand screw conveyer located in the mud-drum $a^3$. Its shaft $i$ is journaled in glands $i^2$, arranged in the ends of the drum, and it is provided with two blades $i^3$, which terminate opposite each other above the mouth of the blow-off pipe. To the end of the shaft $i$ a pulley $i^4$ is shown attached.

Our improvements operate as follows: As soon as steam is raised the conveyer C is set in motion by means of the mechanism above described and is preferably kept in operation constantly as long as the active generation and supply of steam by the boiler continue. The primary effect of rotation of the conveyer is to create two currents of water. The blade $c$ creates a rearward current and the blade $c'$ a forward current, both of which flow along the bottom of the boiler and meet above the mouth $a^2$ of the mud-leg $a'$, where they tend to arrest each other. The current flowing from above the furnace carries with it all sediment which would otherwise settle upon the highly-heated surface above the boiler and form scale, and when it is arrested above the mouth of the mud-leg it deposits the sediment carried, or most of it, while the current flowing forward keeps any sediment from accumulating and forming scale between the mud-leg and the rear end of the boiler and joins the rearward current in depositing sediment in the mouth of said leg. By keeping the conveyer in constant operation and forcibly and continuously overcoming the tendency of the water in the boiler to flow from the rear forward and deposit the bulk of its sediment above the furnace and by carrying all the sediment to the mouth of the mud-leg and there depositing it we cause the sediment to descend into the mud-drum $a^3$. By causing the screw conveyer in the mud-drum to rotate the sediment deposited in the drum can be forced to gather above the mouth of the blow-off pipe $a^4$ and be blown off at will. The conveyer in the drum may be kept in constant motion, but that is not essential, and the drum and the conveyer therein may be dispensed with entirely, if desired, as will be obvious, inasmuch as the frequent removals of sediment by blowing it off is desirable in any case, for it enables the water to be purified and the boiler to be kept perfectly clean. It is not essential that the conveyer in the mud-drum should be kept in motion constantly. It is sufficient to set it in motion a short time before the blow-off valves are opened and keep it going until they are closed. We prefer to use a mud-drum in connection with our apparatus, but, as will be obvious, such a drum may be dispensed with, if desired, where the sediment is blown off frequently. We have thoroughly tested our apparatus and method and have found that they enable us to keep a boiler absolutely free from scale even where the water used is very bad. The special form of gland described is very desirable by reason of the extended support it furnishes the upper end of the driving-shaft F.

The cross E′ of the frame E holds the adjoining ends of the shafts $c^2$ and F in their proper positions with reference to each other regardless of the expansion and contraction of parts and keeps the bevel-wheel $f^3$ and the pinion $c^5$ from getting out of mesh, and the slot $d^3$ in the arm $d^2$ of the frame D and the slot $e^3$ in the arm $e^4$ of the frame E enable the conveyer to be nicely adjusted to and from the shaft F without moving said frames, which last are readily adjusted and when necessary removed. When said bevel-wheel and pinion become worn, the bevel-wheel H is preferably removed from the shaft F and the collar $f'$ upon said shaft loosened, and the shaft F is then pushed up, so as to allow the wheel $f^3$ to drop therefrom and be slipped out laterally. The pinion $c^5$ can then be removed from the shaft $c^2$ without difficulty and new gears inserted. If after the removal of the worn gear-wheel $f^3$ and pinion $c^5$ it is desired to remove the conveyer from its bearings, that can be easily accomplished by merely loosening the nuts $e^8$ and $e^7$ upon the bolts $e^6$ and sliding the frame E forward upon the supporting-flues far enough to cause the front end of the shaft $c^2$ to drop from the bearing $c^7$. By drawing the conveyer forward it can then be caused to drop from the bearing $c^6$. All this can be done without entering the boiler where the boiler is provided with the usual manhole K, such as is shown in dotted lines in Fig. 2, and, if desired, the conveyer can be both introduced and removed through such a manhole.

We have described the form of apparatus we prefer to use in practicing our method of cleaning boilers and preventing scale, but, as will be obvious, other forms of apparatus may be used instead of the one shown.

We claim—

1. The combination of a flue-boiler; and a frame for supporting the end of a conveyer in said boiler, consisting of an upper and a lower cross-piece and means for clamping them upon flues, and the top of the lower cross-piece being transversely corrugated at points where it comes in contact with flues substantially as described.

2. The combination of the frame D consisting of the cross-plate $d$; the lower cross-piece $d'$ corrugated transversely at points on top thereof, and having the arm $d^2$ with the slot $d^3$ through it; means for securing said cross-pieces together and planting them upon boiler-flues; a conveyer-bearing; a rod extending up from said bearing; and means for adjustably securing said rod in said slot substantially as and for the purposes described.

3. The combination of a flue-boiler; a driving-shaft extending down into said boiler; a screw conveyer, bearings for said screw conveyer; a plate having a vertical bearing through which said vertical shaft passes; means rigidly attaching the adjoining conveyer-bearing to said plate; means rigidly securing said plate to flues of said boiler; a bevel-gear on said vertical shaft and a bevel-gear on said conveyer, interlocking with and holding each other in place and means limiting the movement of the conveyer in the direction of the end of the boiler next said plate, substantially as described.

JOHN C. BURNESON.
OLIVER G. RICHEY.

Witnesses:
BENJAMIN FRAZIER REX,
JAMES HANK BURNESON.